United States Patent [19]
Nishigaki et al.

[11] Patent Number: 5,825,968
[45] Date of Patent: Oct. 20, 1998

[54] APPARATUS FOR CONTROLLING A RECORD OPERATION BASED ON A COPY INHIBITING SIGNAL

[75] Inventors: Tetsuo Nishigaki; Takashi Tsujimura, both of Kanagawa, Japan

[73] Assignee: Sony Corporation, Tokyo, Japan

[21] Appl. No.: 773,627

[22] Filed: Dec. 23, 1996

[30] Foreign Application Priority Data

Dec. 28, 1995 [JP] Japan .................................. 7-344165

[51] Int. Cl.$^6$ .................................................. H04N 5/76
[52] U.S. Cl. .............................................. 386/94; 386/83
[58] Field of Search .................................. 386/46, 94, 95, 386/52, 83, 96; 358/908; 360/60, 62; 369/48, 84; H04N 5/76

[56] References Cited

U.S. PATENT DOCUMENTS

| 4,305,101 | 12/1981 | Yarbrough et al. | 386/96 |
| 4,390,904 | 6/1983 | Johnston et al. | 358/908 |
| 4,908,707 | 3/1990 | Kinghorn | 386/83 |
| 5,032,926 | 7/1991 | Imai et al. | 386/52 |
| 5,128,774 | 7/1992 | Takayama | 386/106 |
| 5,159,502 | 10/1992 | Ejima et al. | 360/62 |
| 5,418,853 | 5/1995 | Kanota et al. | 386/94 |

Primary Examiner—Thai Tran
Assistant Examiner—Huy Nguyen
Attorney, Agent, or Firm—Frommer Lawrence & Haug LLP; William S. Frommer

[57] ABSTRACT

An apparatus controls a recording operation, performed by a recording system on a recording medium, of a data signal which includes a copy inhibiting signal. When the copy inhibiting signal is detected, the recording operation is inhibited in the recording system which enters a stand-by state. The recording operation then resumes if the copy inhibiting signal is no longer detected. Alternatively, when the copy inhibiting signal is detected, the data signal is muted while the recording operation continues. The muting operation is cancelled and the normal recording is resumed once the copy inhibiting signal is no longer detected.

9 Claims, 9 Drawing Sheets

APPARATUS FOR CONTROLLING A RECORD OPERATION BASED ON A COPY INHIBITING SIGNAL

BACKGROUND OF THE INVENTION

The invention is related to recording devices and, in particular, a device for controlling and selectively inhibiting a recording operation of an information carrying signal on a recording medium in a video tape recorder (VTR) for example, based on detection of a copy inhibiting signal transmitted along with the information carrying signal.

In the video art, various types of services are well known which employ an information carrying signal superimposed on the vertical blanking period of a video signal. The superimposed signal is referred to as a vertical blanking period superimposed signal, and the superimposed information is called vertical blanking interval data (VBID). One example of the VBID is character multiplexed broadcasting in which image data is transmitted as the main signal, while text data containing alphanumeric characters, for example, is applied as the secondary signal during the vertical blanking period. The VBID may also be used as information indicating a transmission mode in a video system. Still another application of the VBID may include providing programming information, as entered by a user, for scheduling a recording operation of a particular program, for example, on the VTR at a certain date and time.

In addition, the VBID may be used for inhibiting a picture recording operation on the VTR, for example, as required by certain special circumstances surrounding the program content. This anti-copying function is accomplished by adding the copy inhibiting signal in the vertical blanking period of the transmitted image signal. During a dubbing operation of such copy-protected image signal, as for example from one video tape onto another video tape, an automatic gain control circuit of the recording VTR cannot properly record the images when the copy inhibiting signal is present. As a result, the picture recording operation cannot be carried out successfully if the copy inhibiting signal has been superimposed on the image signal.

It is well known, however, that the video industry generally places an emphasis on preventing the illegal or unauthorized dubbing of an entire video tape. In this case, the recording VT R stops the picture recording operation once the copy inhibiting signal is detected. A problem arises when the copy inhibiting signal is included in an intermediate portion of the signal to be recorded. The recording VTR then inconveniently inhibits the recording operation even though the subsequent portion of the copy-protected video signal should be recorded. A need therefore exists for a device that overcomes the above disadvantages.

OBJECTS OF THE INVENTION

It is an object of the invention to control a data recording operation based on detection of a copy inhibiting signal.

It is another object of the invention to selectively inhibit the data recording operation based on detection of the copy inhibiting signal.

It is a further object of the invention to inhibit a reserved recording operation by muting the data signal.

It is still another object of the invention to provide a reservation operation for recording the data signal and to inhibit the reserved recording operation based on detection of the copy inhibiting signal.

It is yet another object of the invention to inhibit the reserved recording operation, based on the detection of the copy inhibiting signal, by muting the data signal.

SUMMARY OF THE INVENTION

These and other objects, features and advantages are accomplished by an apparatus for controlling a recording operation of a data signal on a recording medium. The data signal includes a copy inhibiting signal for selectively inhibiting the recording operation on the recording medium. The inventive apparatus comprises detecting means for detecting the copy inhibiting signal from the data signal; control means for providing, in response to the detection of the copy inhibiting signal, a first control signal to the recording system for selectively performing the recording operation; and display means for displaying a status of the recording operation selectively performed by the recording system.

In accordance with one aspect of the invention, the control means provides the first control signal to the recording system for inhibiting the recording operation if the copy inhibit signal is detected. In this case, the recording system transitions to a stand-by state which is displayed by the display means.

In accordance with another aspect of the invention, the control means provides the first control signal to the recording system for resuming the recording operation if the copy inhibit signal is no longer detected.

In accordance with yet another aspect of the invention, the inventive apparatus further comprises mute means for selectively muting the data signal. In response to another control signal selectively transmitted from the control means, the mute means mutes the data signal supplied to the recording system if the copy inhibiting signal is detected. In this case, the display means indicates that the data signal is muted. When the copy inhibiting signal is no longer detected, the control means cancels the muting operation of the data signal.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings.

Figure 1:
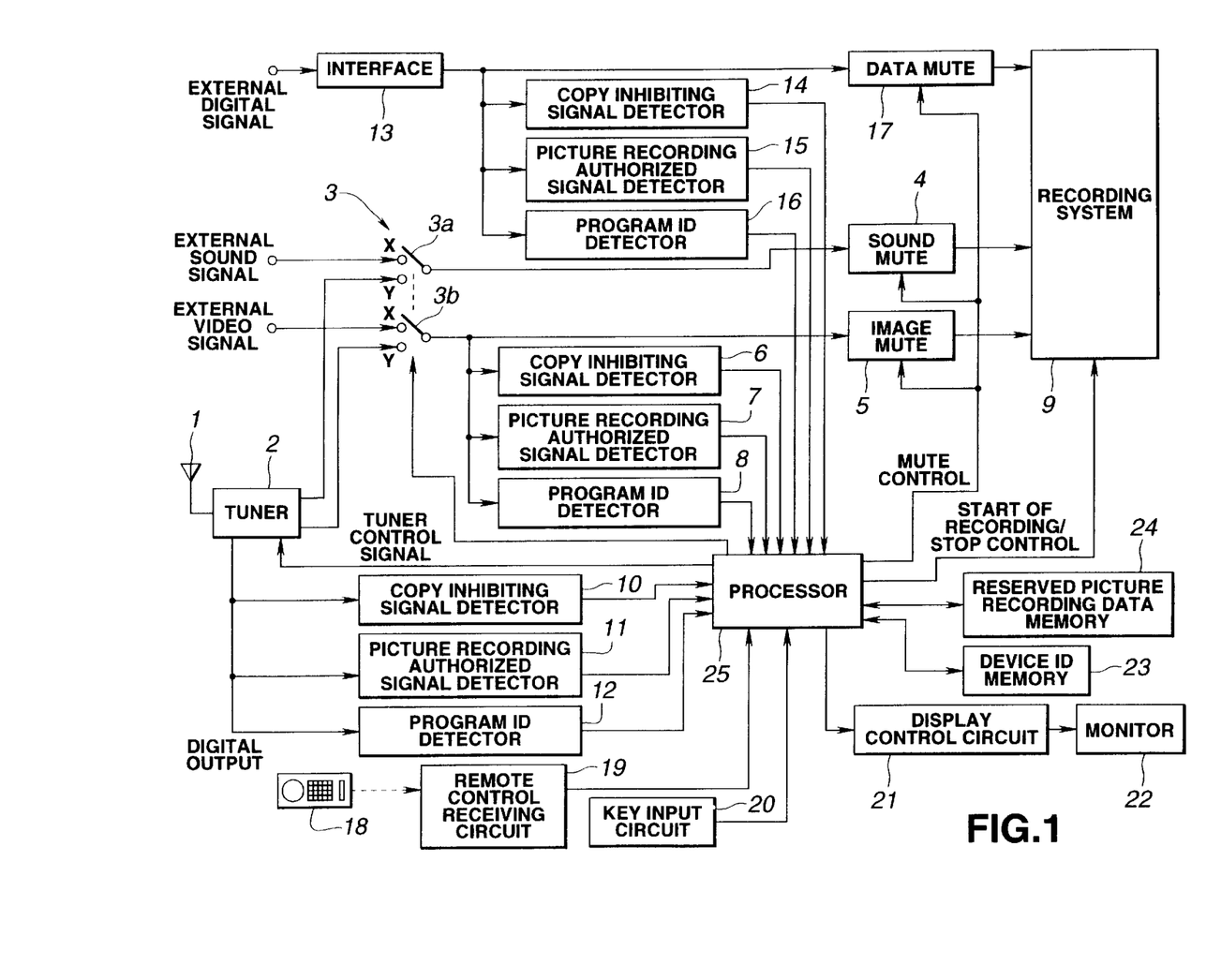
FIG. 1 is a block diagram of an apparatus for controlling a recording operation according to the present invention.

FIG. 1 illustrates an apparatus for controlling a recording operation in accordance with the invention. According to one embodiment, an antenna 1 receives radio frequency signals from a television broadcast, for example, either analog or digital. By transmitting only those audio and image signals which correspond to the user-selected channel, a tuner 2 selects the desired audio and video channel from the signals received by the antenna 1. The selected signals from the tuner 2 are then supplied to a selector switch 3 (comprising sections 3a, 3b) which switches between the signal from the tuner 2 and external audio and video signals selectively supplied to the selector switch 3. Following the selector switch 3, an audio mute circuit 4 may selectively mute the output of the switched audio signal by, for example, reducing the signal amplitude level to substantially zero. Similarly, an image mute circuit 5 may mute an image signal by outputting a predetermined signal, such as "black level" signal, a "white level" signal, a "gray level" signal, a "blue screen" signal, a "red screen" signal, etc. Alternatively, the audio mute circuit 4 and image mute circuit 5 may merely pass the signal from the selector switch 3 unaltered. As will be explained more fully below, the operation of the audio mute circuit 4 and image mute circuit 5 is controlled by a processor 25.

The recording apparatus of the invention further has a copy inhibiting signal detector 6 for detecting a copy inhibiting signal, which may be contained in the video signal. In particular, the copy inhibiting signal may be transmitted during a vertical blanking period employed, for example, by a character multiplexed broadcasting system or an anti-copying system known in the art. Further included is a picture recording authorized signal detector 7 for detecting a signal indicating that the picture recording has been authorized. This signal may also be contained in the video signal and transmitted during the vertical blanking period. If the picture recording authorized signal is detected, the operation of the copy inhibiting signal is overridden. That is, a recording system 9 controlled by the processor 25 immediately carries out a picture recording operation on a recording medium, even though the copy inhibiting signal has been detected. The apparatus according to the present invention also has a program ID detector 8 for extracting from the video signal a program identification (ID) which may be transmitted in accordance with, for example, the IEEE 1394 Serial Bus standard. Similar to the above-described signals, the program ID may be included in the vertical blanking period of the video signal. The function of each of the above components will be more fully understood in connection with description of the operation of the apparatus hereinbelow.

As mentioned above and shown in FIG. 1, the recording apparatus is connected to the recording system 9 for recording on the recording medium audio and image signals supplied from the audio mute circuit 4 and the image mute circuit 5, respectively. The recording system 9 can record either an analog or digital signal and may be a video tape recorder using the VHS or beta standard, a digital video disk recorder, an optical recorder, etc.

To accommodate a video/audio digital broadcasting mode as indicated by a signal path labeled "DIGITAL OUTPUT" leading from the tuner 2 in FIG. 1, further included in the apparatus are a copy inhibiting signal detector 10, a picture recording authorized signal detector 11, and a program ID detector 12. The functions of these components are analogous to the functions of their counterparts labeled 6, 7 and 8 shown in FIG. 1 and described above. Consequently, the detailed description of the copy inhibiting signal detector 10, picture recording authorized signal detector 11, and program ID detector 12 will be omitted for the sake of clarity.

The apparatus is further provided with an interface 13 for obtaining data from a computer, for example. A copy inhibiting signal detector 14, a picture recording authorized data detector 15 and a program ID detector 16 perform substantially the same functions, associated with computer data, as their counterparts labeled 6, 7 and 8 or 10, 11 and 12 which have been described above.

The apparatus may also include a remote control transmitting unit 18 for accepting various user commands. The user commands may require an immediate picture recording operation, a reservation operation to start recording video images at a desired time, and a reservation operation to start recording a desired program based on the program ID. A remote control receiving circuit 19 receives the user-input commands from the remote control transmitting unit 18 and sends the appropriately processed signals, corresponding to the user commands, to the processor 25 for controlling the execution of the requested command. Alternatively, a key input circuit 20 can perform similar operations as the remote control transmitting unit 18 by providing a keypad for command entry by the user and subsequently sending the signals, corresponding to the requested setting, to the processor 25.

In addition, the apparatus has a monitor 22 for displaying a predetermined message on its screen during the recording operation, for example. The monitor 22 allows the user to view the state of the recording system 9, indicating a status of the recording operation, and is controlled by a display control circuit 21 which, in turn, responds to instructions issued from the processor 25.

Furthermore, the recording apparatus includes a device ID memory 23 for storing the user-requested commands and a reserved picture recording data memory 24 as storage means for storing reservation data, including the program ID. As stated above, the processor 25 with its internal, i.e., on-board, clock controls the entire recording operation.

A general overview of the recording operation according to the invention is provided via an example in which a television broadcast program is recorded on the recording medium of the recording system 9. Initially, the processor 25 sets the selector switch 3 to a Y terminal such that a broadcasted audio signal is output from the switch 3a, and a broadcasted image signal is output from the switch 3b. Then, the picture recording of the television broadcast is started by setting the remote control transmitting unit 18 or the key input circuit 20 to the appropriate configuration. When a copy-protected portion of the broadcast is encountered, the picture recording operation by the recording system 9 is stopped under the control of the processor 25. However, subsequent to the protected signal portion, the picture recording operation of the television broadcast which is not copy-protected can be resumed if the copy inhibiting signal is no longer present. Hence, the images recorded on the recording medium of the recording system 9 appear continuous during reproduction, even though some portions of the signal are copy protected and are not recorded. As a result and in accordance with the invention, unreproducible copy-protected images are not recorded by the recording system 9, thereby eliminating any inconvenience from interruption of the viewing process.

In accordance with one aspect of the invention, a signal provided from the antenna 1 or an external video/audio signal is supplied through the selector switch 3 to the audio mute circuit 4 and the image mute circuit 5 which may selectively mute the signal, as directed by the processor 25, if the copy inhibiting signal has been detected. Following the muting operation, the audio mute circuit 4 and the image mute circuit 5 send the muted audio and image signals, respectively, to the recording system 9 for recordation on the recording medium. Similarly, information-carrying data received from a digital television broadcast may be supplied to the recording system 9 via the selector switch 3, the audio mute circuit 4 and the image mute circuit 5, based on the instructions issued by the processor 25. During the detection of the copy inhibiting signal, the audio and image signals are muted and transmitted in this state to the input of the recording system 9. In an analogous manner, a digital signal supplied to the interface 13 by a computer, for example, is furnished to the recording system 9 through a data mute circuit 17, controlled by the processor 25. The data mute circuit 17 mutes the data signal from the interface 13 by outputting a predetermined digital sequence corresponding to a "black level", a "white level", a "gray level", a "blue screen", a "red screen", etc., if the copy inhibiting signal is detected. The muted data signal is then recorded by the recording system 9.

Figure 2:
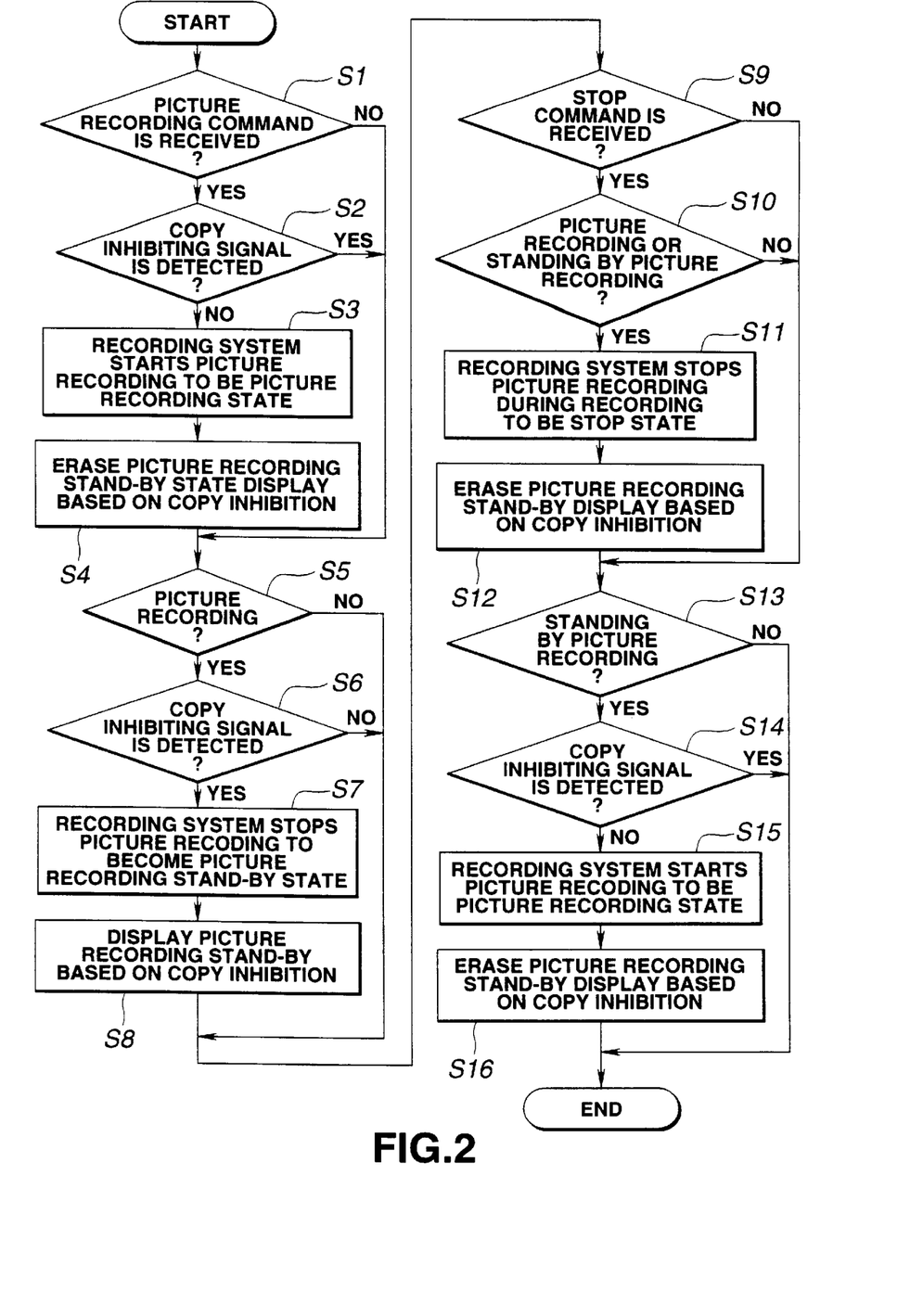
FIG. 2 is a flowchart for explaining a control operation of a recording system according to one embodiment of the invention.

The detailed operation of the recording apparatus according to one embodiment of the invention is shown in the flowchart of FIG. 2. Initially, when a desired channel is set via the remote control transmitting unit 18 or the key input circuit 20, the processor 25 generates a control signal to the tuner 2 so that the audio and image signals of the user-selected channel are supplied to the selector switch 3. The operation then proceeds to step S1 of FIG. 2, where the processor 25 determines whether a picture recording command has been received from the user via the remote control transmitting unit 18 or key input circuit 20. If so, the processor 25 determines, in step S2, if the copy inhibiting signal detector 6 has detected a copy inhibiting signal in the image signal.

If the copy inhibiting signal has not been detected, the processor 25 issues a command to the recording system 9 to start recording the audio and image signals in step S3. At this point, the recording system 9 enters a picture-recording state. In step S4, the processor 25 controls the monitor 22, via the display control circuit 21, to erase a picture recording stand-by display. This is based on the absence of the copy inhibiting signal in the video signal, as previously determined by the copy inhibiting signal detector 6 in step S2.

Next, a decision is made by the processor 25 in step S5 whether the recording system 9 is currently in the process of recording an image. If so, another decision is made in step S6 whether a copy inhibiting signal has been detected. If the copy inhibiting signal has been detected, the recording system 9 stops the picture recording operation in response to a control signal from the processor 25, and enters a picture recording stand-by state in step S7. Since the picture recording operation is inhibited for this portion of the video signal, a picture recording stand-by display is shown on the monitor 22, as directed by a control signal from the processor 25.

Continuing with the description of the flowchart, in step S9 if the processor 25 receives a command from the user, via the remote control 18 for example, to stop recording, a determination is made, in step S10, whether the recording system 9 is in the process of recording a picture or standing-by (waiting) for a picture recording. If so, the recording system 9 stops the recording operation and enters a stop state in step S11. As a result, in step S12, the picture recording stand-by display is erased on the monitor 22. Next, the processor 25 determines, in step S13, whether the recording system 9 is in the stand-by state, i.e., waiting for the continuation of the picture recording operation. If so, it is decided in step S14, whether the copy inhibiting signal detector 6 has detected a copy inhibiting signal in the video signal. If the copy inhibiting signal has not been detected, the processor 25 instructs the recording system 9 to resume the picture recording operation by entering the picture recording state in step S15. Hence, the recording operation of the audio and video signal on the recording medium continues, without any recorded unreproducible images, once the copy inhibiting signal is no longer detected. Finally, in step S16, the display for the picture recording stand-by state is erased on the monitor 22 under the control of the processor 25 to indicate the continuation of the recording operation to the user.

Figure 3:
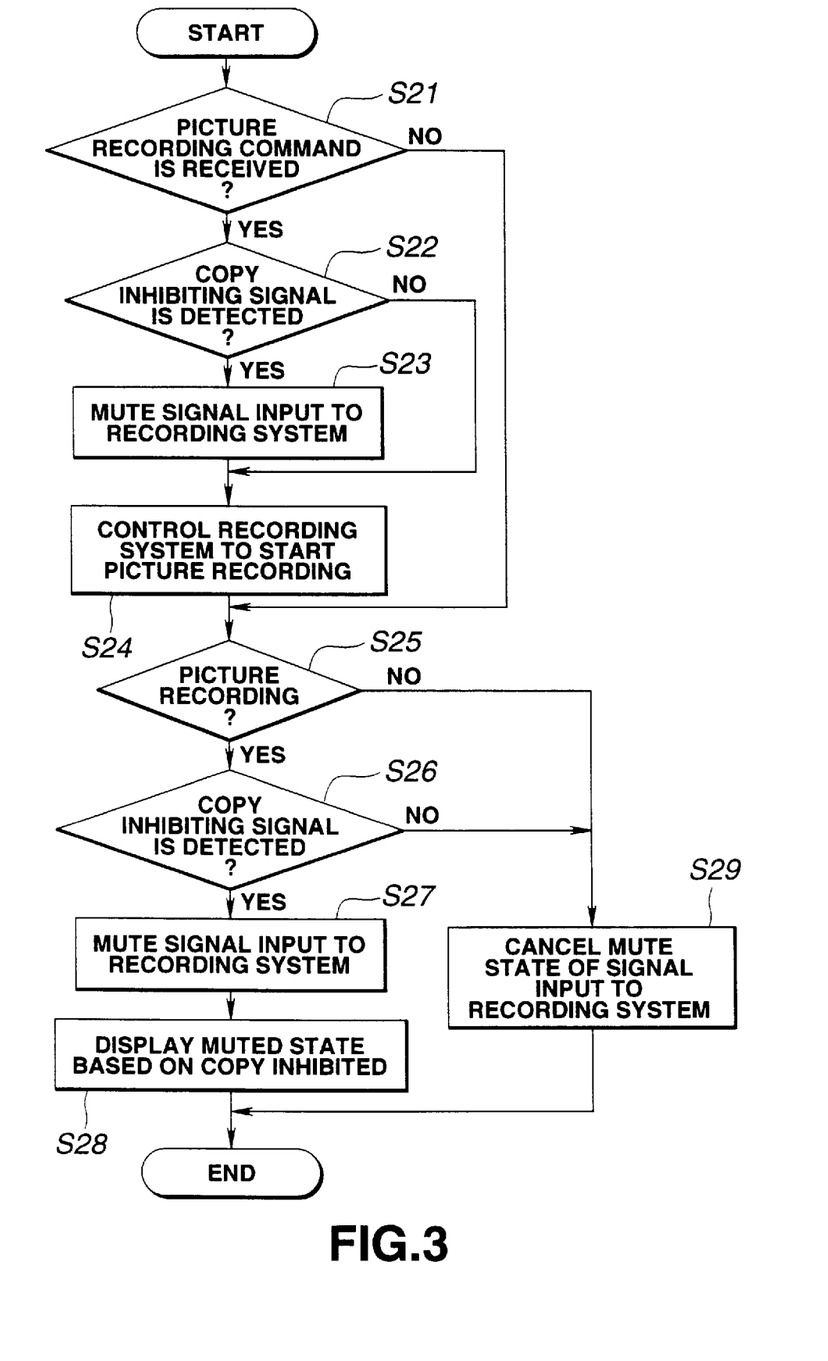
FIG. 3 is a flowchart for explaining a control operation of a recording system according to another embodiment of the invention.

In accordance with another aspect of the invention, after the picture recording operation of the television broadcast is started by setting the appropriate configuration via the remote control transmitting unit 18 or the key input circuit 20, the audio and image signals are muted when a copy-protected portion of the broadcast is encountered. Recordation of the signal, although muted, continues on the recording medium such that the recording operation of the recording system 9 proceeds without any interruption.

In particular, if a desired channel is set via the remote control transmitting unit 18 or the key input circuit 20, the processor 25 generates a control signal to the tuner 2 for supplying the audio and image signals of the user-selected channel to the selector switch 3. The operation then continues in step S21 of FIG. 3, where the processor 25 determines whether a picture recording command has been received from the user. If so, a decision is carried out, in step S22, whether the copy inhibiting signal detector 6 has detected a copy inhibiting signal in the image signal, and in such a case the processor 25 transmits a control signal to the audio mute circuit 4 and the image mute circuit 5 to mute the audio and image signals, respectively, in step S23. The muted signal is then supplied to the input of the recording system 9 for recordation on the recording medium.

Next, in response to the control signal from the processor 25, the recording system 9 starts recording the muted audio and image signals in step S24. A decision is then undertaken, in step S25, whether the recording system 9 is in the process of recording a picture image. If so, the processor 25 determines, in step S26, whether the copy inhibiting signal detector 6 detected the copy inhibiting signal. If this is the case, the audio and image signals are muted, and the recording system 9 enters the muted state in step S27. That is, the muted audio and video signals are recorded on the recording medium without interrupting the picture recording operation of the recording system 9. Then, under the control of the processor 25, the monitor 22 indicates, in step S28, the muted state of the recording system 9 as a result of the copy protected portion of the video signal.

If in step S25 the recording system 9 is not in the process of recording a picture image, or if the copy inhibiting signal has not been detected in step S26, then the processor 25 directs the audio mute circuit 4 and the image mute circuit 5 to terminate the muting operation of the audio and video signals in step S29. The normal recording operation then follows.

To summarize, when the copy inhibiting signal included in the information carrying data signal has been detected, the audio and image signals are muted without stopping the recording operation of the recording system 9. Subsequently, when the copy inhibiting signal no longer is present, the muting operation by the audio mute circuit 4 and video mute circuit 5 is either bypassed or terminated, depending on the circumstances. Consequently, only selected portions of the video and audio signals are not recorded.

Still another aspect of the invention is directed to a reservation for recording a television broadcast program, including a copy protected portion, based on start and end times for the recording operation. The reserved recordation time may be set, via the remote control transmitting unit 18 or the key input circuit 20, to start and end at the predetermined times. The picture recording at the scheduled time is started and then while being recorded, is stopped if, for example, the copy inhibiting signal has been detected. In particular, when a reserved recording operation is set to a desired channel and time, the processor 25 controls the reserved recording data memory 24 to store the user-input setting. The operation then continues with step S31 of FIG. 4. In step S31, the processor 25 determines whether the reserved recording operation has been entered, i.e., stand-by for the reserved recording operation. If so, the processor 25 determines, in step S32, if its internal clock has reached the reserved recording start time as stored in the reserved picture recording data memory 24. When the internal clock reaches the reserved recording start time, the processor 25 supplies a control signal to the tuner 2 based on the data stored in the reserved picture recording data memory 24, so that the audio and image signals from the set channel can be supplied to the selector switch 3, as represented by step S33.

Figure 4:
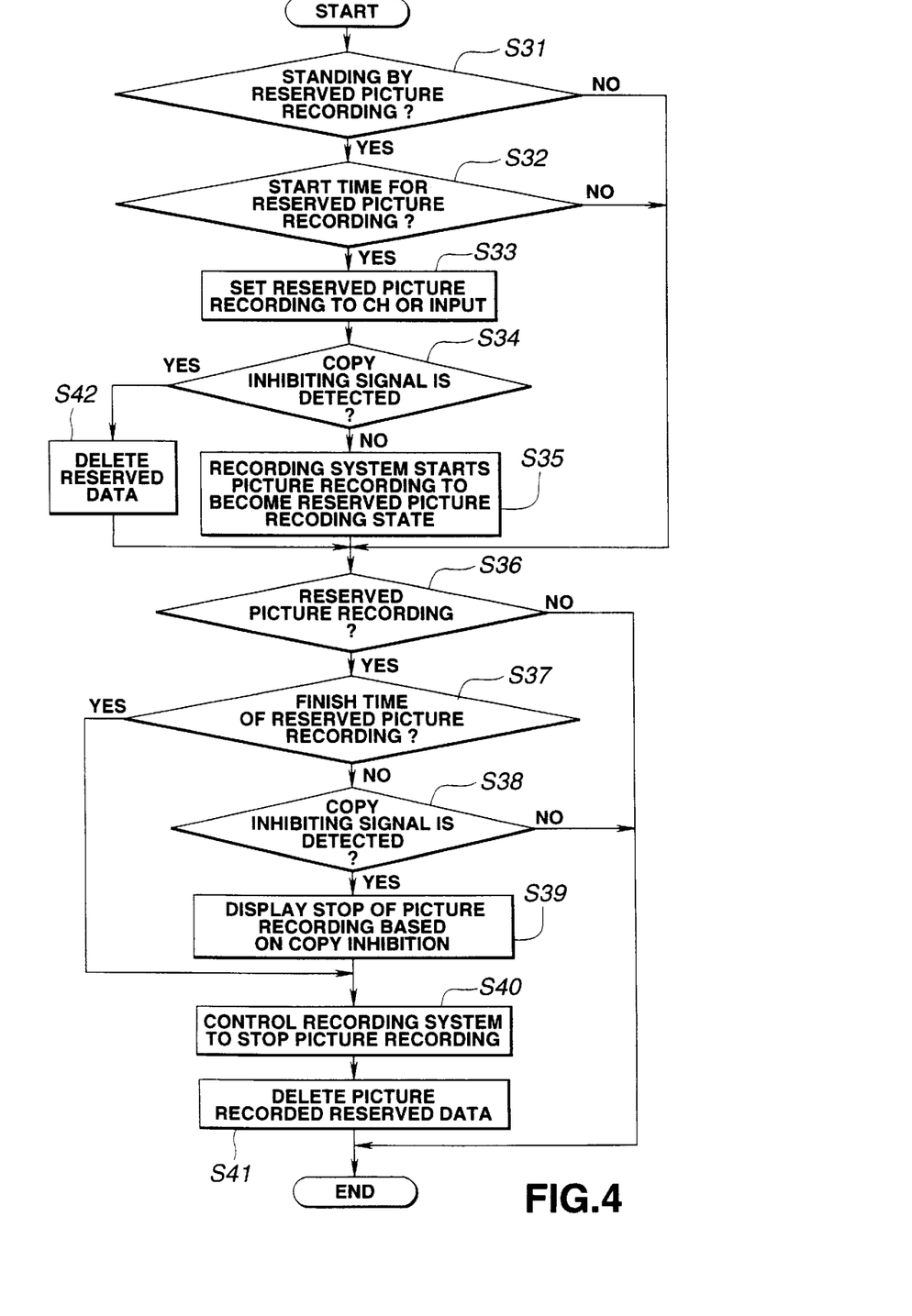
FIG. 4 is a flowchart for explaining a control operation of a recording system according to yet another embodiment of the invention.

Next in step S34, if the copy inhibiting signal has not been detected, the recording system 9 starts recording the audio and image signals and enters the reserved recording state. In step S36, the processor 25 determines whether the recording system 9 is recording the reserved picture, and if so, the internal clock is compared, in step S37, with the finish time of the reserved recording operation as stored in the reserved picture recording data memory 24. If the reserved recording operation must continue but the copy inhibiting signal has been detected in step S38, the monitor 22 displays the end of the reserved recording operation due to the copy protection as represented by step S39.

Next, in step S40, the processor 25 controls the recording system 9 to stop the picture recording operation, and then the reserved recording data, previously stored in the reserved picture recording data memory 24, is deleted in step S41.

Figure 5:
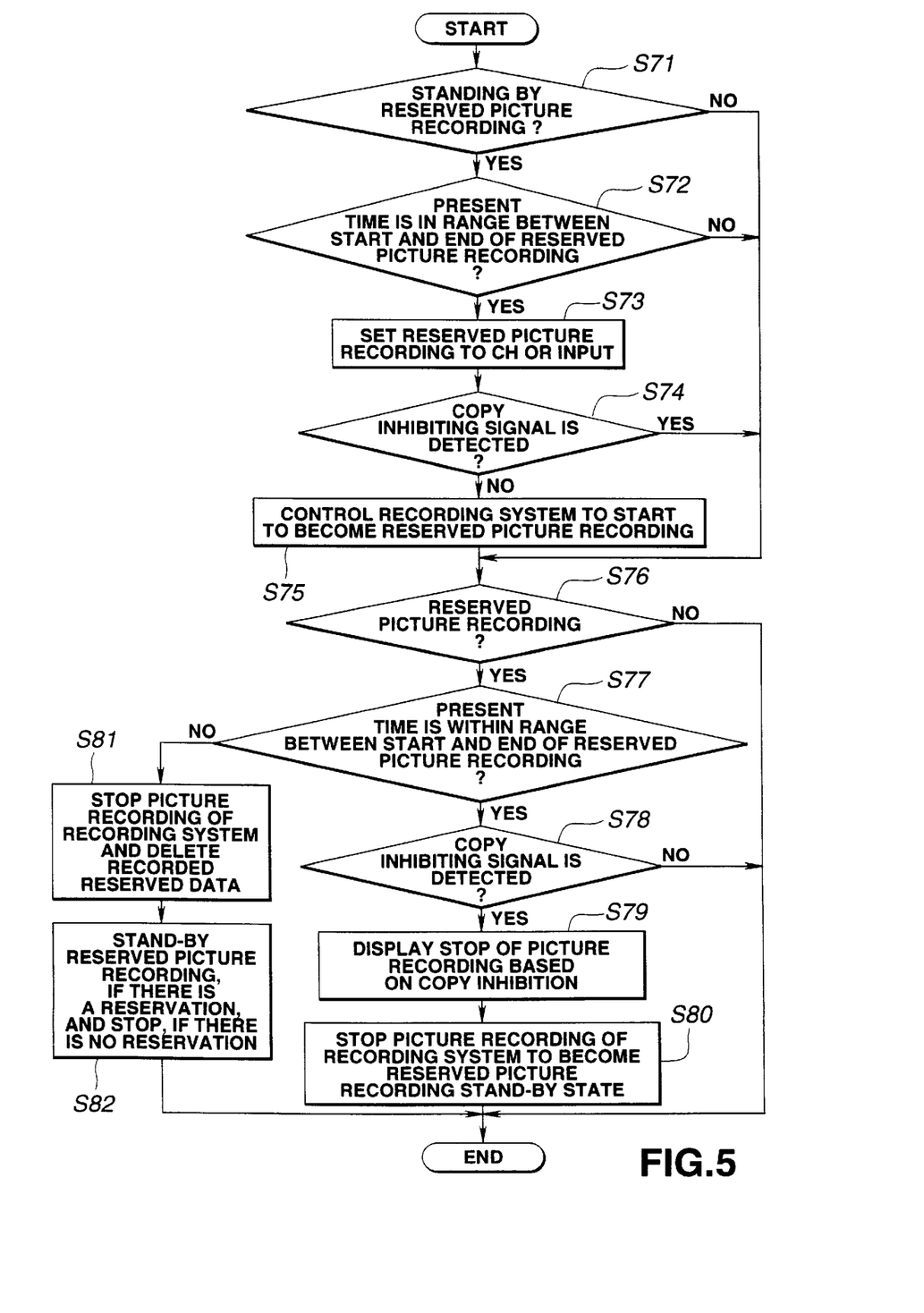
FIG. 5 is a flowchart for explaining a control operation of a recording system according to still another embodiment of the invention.

When several reserved recording operations are set by the user, the above-described operation can be similarly carried out, as illustrated in FIG. 5. Thus, in step S71, the processor 25 determines whether the reserved recording operation has been entered, and if so, in step S72, whether the processor internal clock is between the start and end time of the reserved recording operation, as stored in the reserved picture recording data memory 24. In this case, the processor 25 supplies a control signal to the tuner 2 based on the data stored in the reserved picture recording data memory 24, and the audio and image signals from the set channel are supplied to the selector switch 3 in step S73.

Next in step S74, when the copy inhibiting signal has not been detected, the recording system 9 starts recording the audio and image signals. In step S76, the processor 25 determines whether the recording system 9 is recording the reserved picture. If so, and if the internal clock is between the start and end time of the reserved recording operation, as determined in step S77, and if step S78 determines whether the copy inhibiting signal has been detected, the monitor 22 displays the stop reserved recording message based on the detected copy inhibited signal. Next, in step S79, the processor 25 controls the recording system 9 to stop the picture recording operation.

If, in step S77, the internal clock is not between the start and end time of the reserved recording operation, the picture recording operation is stopped and the reserved recording data, previously stored in the reserved picture recording data memory 24, is deleted in step S81. Then, in step S82, the recording system 9 enters the reserved recording stand-by state if other recording reservation operations have been set. Otherwise, the recording operation is stopped.

Figure 6:
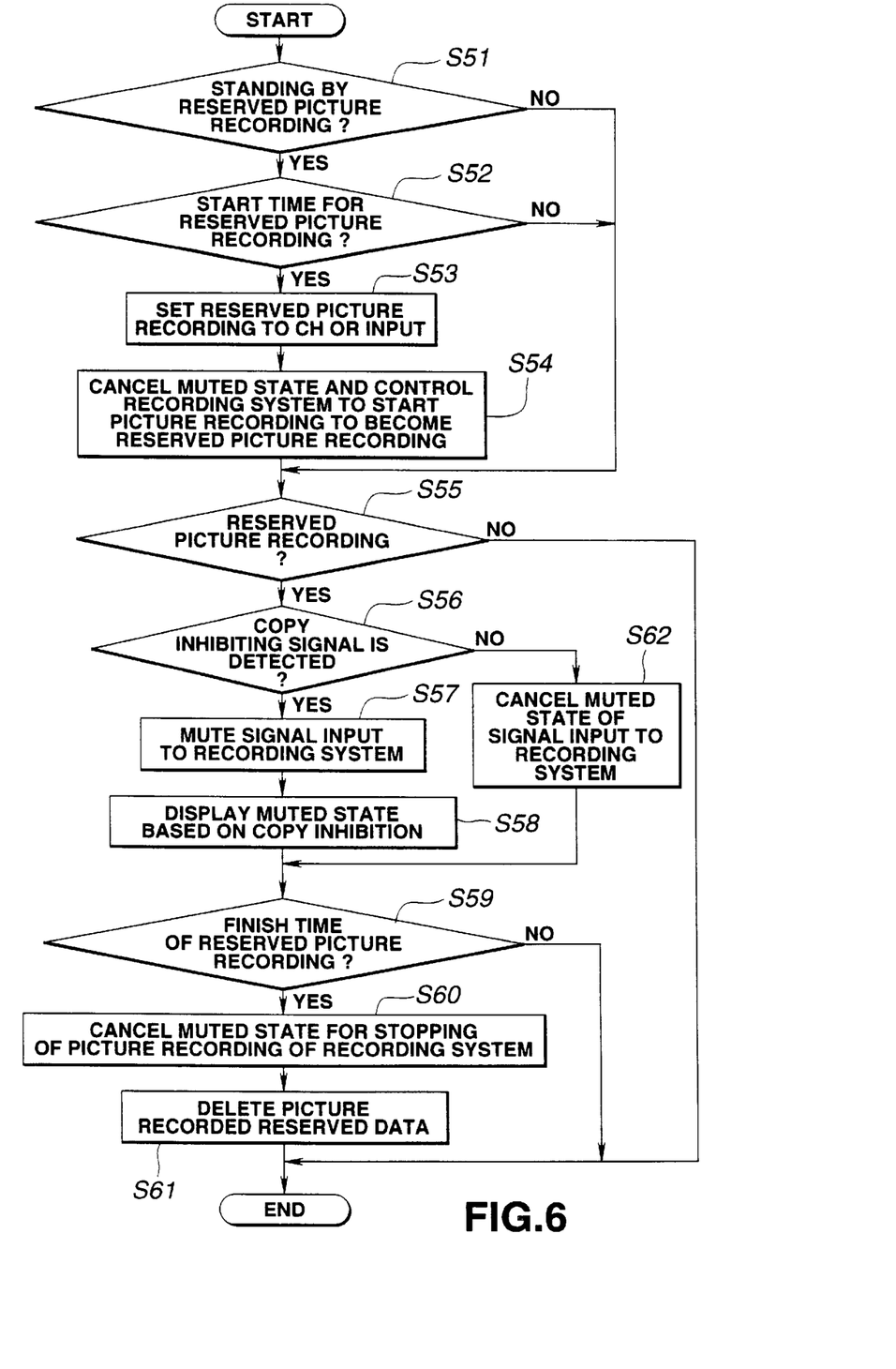
FIG. 6 is a flowchart for explaining a control operation of a recording system according to a further embodiment of the invention.

In yet another aspect of the invention, the audio and image signals are muted if the copy inhibit signal is detected during the reserved recording operation. As shown in FIG. 6, the first three steps S51, S52 and S53 are identical to the steps S31, S32 and S33, respectively, of FIG. 4 and their description will be omitted. Thus, continuing with step S54 in FIG. 6, the processor 25 directs the audio mute circuit 4 and the image mute circuit 5 to supply an audio signal and the image signal, which are not muted, to the recording system 9. The processor 25 also sends a control signal to the recording system 9 to start the reserved recording operation.

In step S55, the processor determines whether the recording system 9 is recording the reserved picture, and if so, whether the copy inhibiting signal has been detected in step S56. If this is the case, the processor 25 transmits a control signal to the audio mute circuit 4 and the image mute circuit 5 to mute the audio and image signals, respectively, in step S57. Then, under the control of the processor 25, the monitor 22 indicates, in step S58, the muted state of the recording system 9 due to the copy protected portion of the video signal.

Next, the processor 25 determines, in step S59, whether the internal clock has reached the finish time of the reserved picture recording information stored in the reserved picture recording data memory 24. If so, the recording system 9 stops the recording operation, while the mute operation by the audio mute circuit 4 and the image mute circuit 5 are also terminated in step S60. Finally, in step S61, the processor 25 deletes the reserved picture recording information stored in the reserved picture recording data memory 24 and finishes the reserved recording operation.

Returning to step S56, if the copy inhibiting signal has not been detected, then the processor 25 directs the audio mute circuit 4 and the image mute circuit 5 to terminate the muting operation of the audio and video signals in step S62. The normal recording operation then follows.

In a further aspect of the invention, a reservation for recording a television broadcast program, including a copy protected portion, based on a program ID is described next. In particular, when a reserved recording operation is set to a desired channel, the processor 25 controls the reserved recording data memory 24 to store the user-input setting. The operation then continues with step S91 of FIG. 7.

Figure 7:
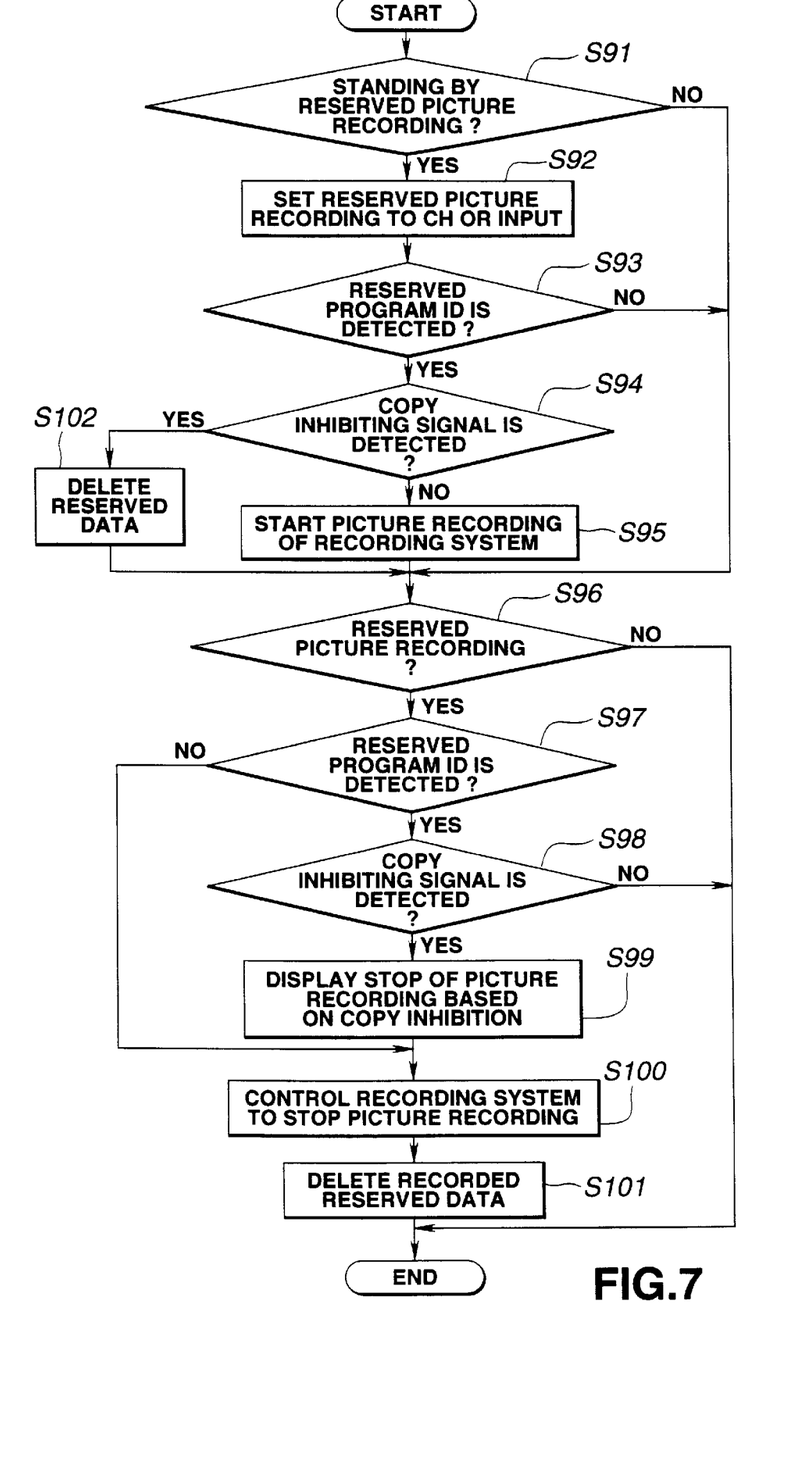
FIG. 7 is a flowchart for explaining a control operation of a recording system according to a still further embodiment of the invention.

In step S91, the processor 25 determines whether the reserved recording operation has been entered, and if so, supplies a control signal to the tuner 2, in step S92, based on the data stored in the reserved picture recording data memory 24. As a result, the audio and image signals from the set channel only are supplied to the selector switch 3. In step S93, the processor 25 determines whether a program ID signal detected by the program ID detector 8 is the same as the program ID stored in the reserved picture recording data memory 24. A determination is then made, in step S94, whether the copy inhibiting detector 6 has detected the copy inhibiting signal. If this is not the case, the processor 25 sends a control signal to the recording system 9 to start a picture recording operation in step S95. Otherwise, the reservation data is deleted from the memory in step S102.

Next, the processor 25 determines, in step S96, whether the recording system 9 is recording the reserved picture, and if so, whether the detected program ID matches the program ID stored in the reserved picture recording data memory 24. If this is the case, when the copy inhibiting signal is detected in step S98, the monitor 22 displays the stoppage of the reserved recording operation in step S99. Then, in step S100, the processor 25 controls the recording system 9 to stop the picture recording operation, and the reserved recording data, previously stored in the reserved picture recording data memory 24, is deleted in step S101.

It is worth noting that back in step S94, if the copy inhibiting signal has been detected (prior to the start of the recording operation by the recording system 9), the reservation data is deleted from the reserved picture recording data memory in step S102.

Figure 8:
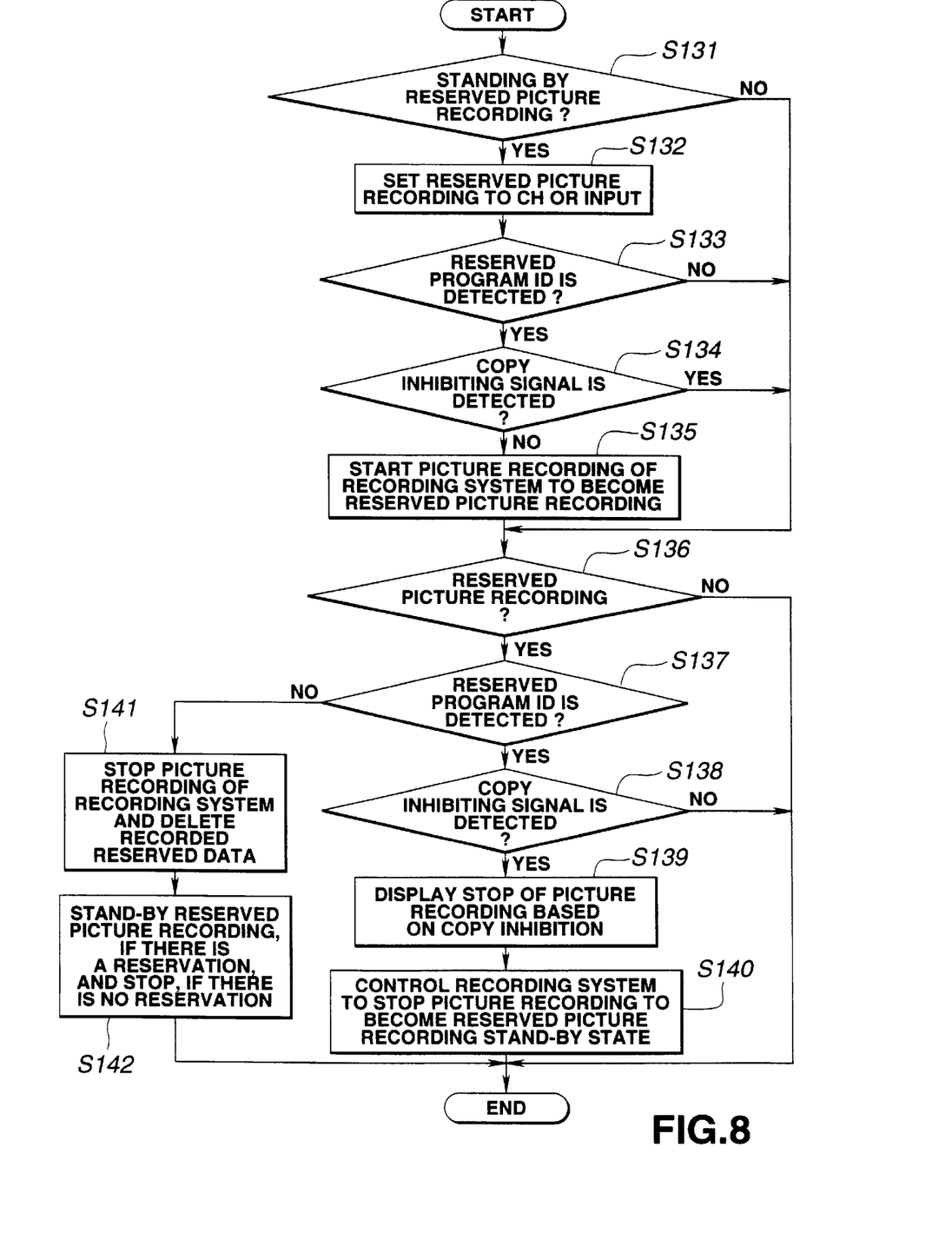
FIG. 8 is a flowchart for explaining a control operation of a recording system according to yet a further embodiment of the invention.

When several reserved recording operations based on the program ID are set by the user, the above-described operation can be similarly carried out, as illustrated in FIG. 8. The first three steps S131, S132 and S133 of FIG. 8 are identical to the steps S91, S92 and S93, respectively, of FIG. 7, and their description will be omitted. Thus, continuing with step S134 in FIG. 8, a determination is made if the copy inhibiting signal has been detected. If this is not the case, the processor 25 sends a control signal to the recording system 9 to start a reserved recording operation in step S135.

Next, the processor 25 determines, in step S136, whether the recording system 9 is recording the reserved picture, and if so, whether the detected program ID matches the program ID stored in the reserved picture recording data memory 24 in step S137. If this is the case, when the copy inhibiting signal is detected in step S138, the monitor 22 displays the stoppage of the reserved recording operation in step S139. Then, in step S140, the processor 25 directs the recording system 9 to stop the picture recording operation, and the recording system 9 enters a reserved recording operation stand-by state.

If, in step S137, the proper program ID is not detected by the program ID detector 8, the picture recording operation is stopped and the reservation data, previously stored in the reserved picture recording data memory 24, is deleted in step S141. Then, in step S142, the recording system 9 enters the reserved recording operation stand-by state if other recording reservation operations have been set. Otherwise, the recording operation is stopped.

Figure 9:
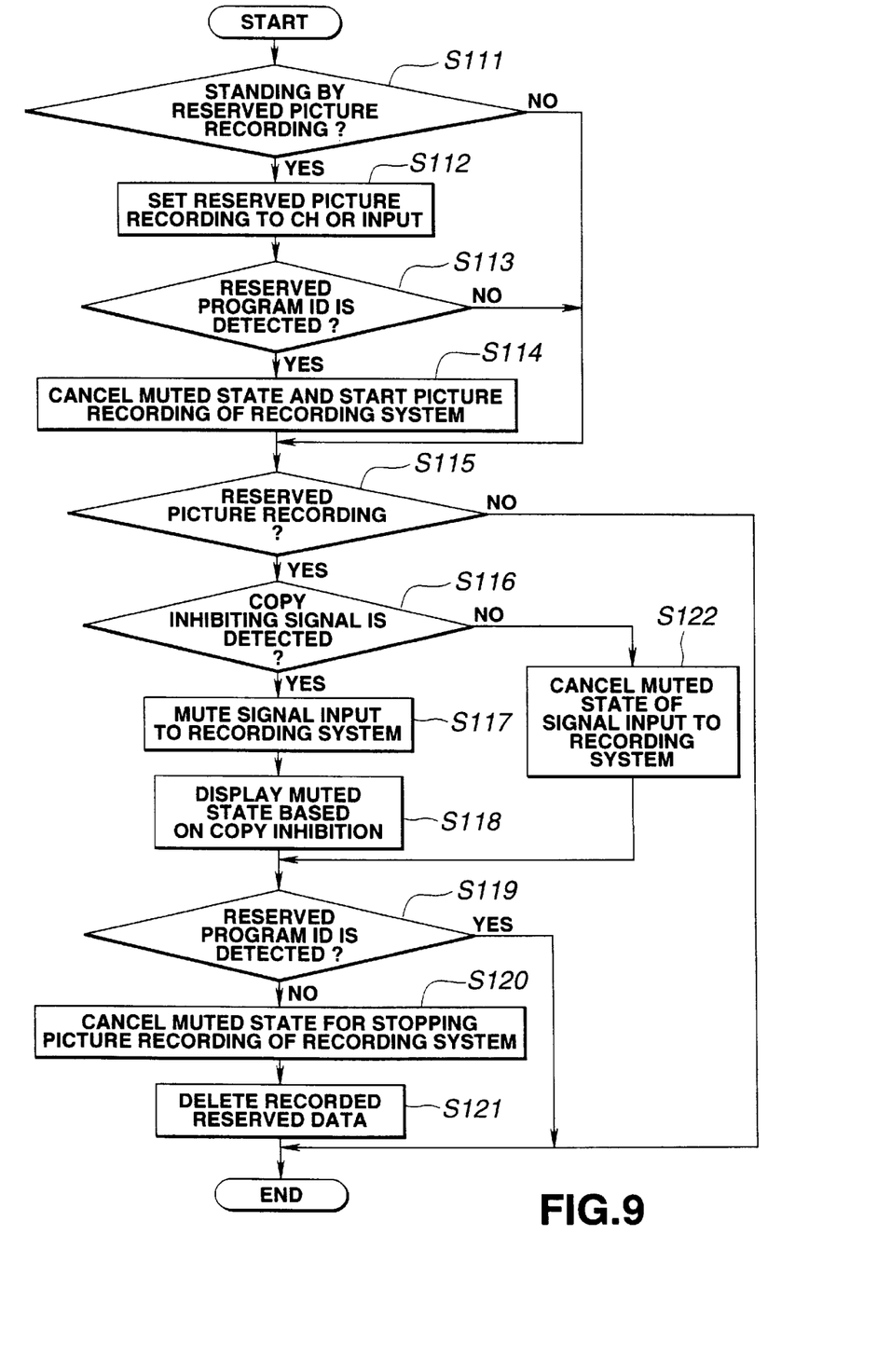
FIG. 9 is a flowchart for explaining a control operation of a recording system according to yet another embodiment of the invention.

In yet a further aspect of the invention, the audio and image signals are muted if the copy inhibit signal is detected during the reserved recording operation set according to the program ID. The first three steps S 11, S112 and S113 of FIG. 9 are identical to the steps S91, S92 and S93, respectively, of FIG. 7, and their description will be omitted. Thus, continuing with step S114 in FIG. 9, the processor 25 directs the audio mute circuit 4 and the image mute circuit 5 to supply an audio signal and the image signal, which are not muted, to the recording system 9. The processor 25 also sends a control signal to the recording system 9 to start a reserved recording operation.

In step S115, the processor determines whether the recording system 9 is recording the reserved picture, and if so, whether the copy inhibiting signal has been detected in step S116. If this is the case, the processor 25 transmits a control signal to the audio mute circuit 4 and the image mute circuit 5 to mute the audio and image signals, respectively, in step S117. Then, under the control of the processor 25, the monitor 22 indicates, in step S118, the muted state of the recording system 9 as a result of the copy protected portion of the video signal.

Next, the processor 25 determines, in step S119, whether the detected program ID matches the program ID stored in the reserved picture recording data memory 24. If this is not the case, the recording system 9 stops a picture recording operation, while the mute operation by the audio mute circuit 4 and the image mute circuit 5 are also terminated in step S120. Finally, in step S121, the processor 25 deletes the reserved picture recording data stored in the reserved picture recording data memory 24 and finishes the reserved recording operation.

Back in step S116, if the copy inhibiting signal has not been detected, then the processor 25 directs the audio mute circuit 4 and the image mute circuit 5 to terminate the muting operation of the audio and video signals in step S122. The normal recording operation then follows.

Although the recording operation of the audio and image signals supplied from a television broadcast are specifically described above, it is to be understood that this description is exemplary only and the invention is not limited thereto. For example, according to the invention, the tuner 2 can receive a digital television broadcast. In this case, digital data is received and selected by the tuner 2 and is then transmitted to the copy inhibiting data detector 10. When the processor 25 determines that the copy inhibiting signal detector 10 has detected the copy inhibiting signal, processing operations similar to the ones described above are carried out. That is, the recording system 9 inhibits the recording operation based on the copy inhibiting signal, while the audio mute circuit 4 and the image mute circuit 5 are controlled to mute the audio and image signals, respectively, supplied to the recording system 9. Similarly, the inventive recording apparatus can control the audio and video signals externally supplied to the selector switch 3. Furthermore, a digital signal supplied through the interface 13 from a computer, for example, can be controlled in the same manner as described above.

In addition, information indicating that the data signal is muted may be recorded in the sub-code area of the recording medium. The sub-code area is a part in which the image signal, audio signal, etc. are not recorded. When a reproducing device for replaying the recording medium reproduces this information from the sub-code area, an image display device may indicate that the picture recording operation is inhibited. Thus, information that an image, etc. is muted can be provided to a user.

Further, when the reproducing device reproduces the information on the muted signals, a skip operation may be performed. Since appropriate index information may be recorded in the sub-code area, for example, at the start and end portions of the muted signal, the reproducing device can skip or fast-forward through that portion of the signal, as designated by the index information. Consequently, the user need not be inconvenienced by having to proceed through the muted portion of the signal during the reproduction from the recording medium.

Further, according to the invention, the recording conditions, such as the end of the picture recording operation in a normal picture recording state or in the muted state or in a picture recording stop state due to the inhibited picture recording operation, may be recorded in the reserved picture recording data memory 24, for example. Consequently, the recording apparatus can recognize the terminating conditions for the picture recording process, without requiring the explicit cancellation of the mute operation of the audio mute circuit 4 and the image mute circuit 5 prior to the start of the normal picture recording operation.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for controlling a recording operation of a data signal on a recording medium, said data signal including a copy inhibiting signal for selectively inhibiting said recording operation on said recording medium, said apparatus comprising:

first detecting means for detecting a transmitted program identification for said recording operation;

second detecting means for detecting said copy inhibiting signal from said data signal;

storage means for storing reservation data identifying when said recording operation is to be carried out, said reservation data including a program identification such that said recording operation is carried out if said program identification matches said transmitted program identification;

control means for providing a first control signal to inhibit said recording operation if said copy inhibiting signal is detected, and for providing a second control signal to said storage means to delete said reservation data; and display means for displaying a status of said recording operation.

2. The apparatus according to claim 1, wherein said data signal is selected from an audio signal, a video signal and a computer signal.

3. A method for controlling a recording operation of a data signal on a recording medium, said data signal including a copy inhibiting signal for selectively inhibiting said recording operation on said recording medium, said method comprising the steps of:

detecting a transmitted program identification for said recording operation;

detecting said copy inhibiting signal from said data signal;

storing reservation data identifying when said recording operation is to be carried out, said reservation data including a program identification such that said recording operation is carried out if said program identification matches said transmitted program identification;

supplying a first control signal to inhibit said recording operation if said copy inhibiting signal is detected, and supplying a second control signal to delete said reservation data; and displaying a status of said recording operation.

4. Apparatus for controlling a recording operation of a data signal on a recording medium, said data signal including a copy inhibiting signal for selectively inhibiting said recording operation on said recording medium, said apparatus comprising:

first detecting means for detecting a transmitted program identification for said recording operation;

second detecting means for detecting said copy inhibiting signal from said data signal;

storage means for storing reservation data identifying when said recording operation is to be carried out, said reservation data including a program identification such that said recording operation is carried out if said program identification matches said transmitted program identification;

control means for selectively providing a first control signal for inhibiting said recording operation or a second control signal for muting said data signal if said copy inhibiting signal is detected, said control means providing a third control signal to said storage means for deleting said reservation data; and display means for displaying a status of said recording operation.

5. The apparatus according to claim 4, wherein said control means cancels the muting of said data signal if said copy inhibiting signal is no longer detected.

6. The apparatus according to claim 4, wherein said display means indicates that said data signal is muted.

7. The apparatus according to claim 4, wherein said data signal is selected from an audio signal, a video signal and a computer signal.

8. A method for controlling a recording operation of a data signal on a recording medium, said data signal including a copy inhibiting signal for selectively inhibiting said recording operation on said recording medium, said method comprising the steps of:

detecting a transmitted program identification for said recording operation;

detecting said copy inhibiting signal from said data signal;

storing reservation data identifying when said recording operation is to be carried out, said reservation data comprising a program identification such that said recording operation is carried out if said program identification matches said transmitted program identification;

selectively providing a first control signal for inhibiting said recording operation or a second control signal for muting said data signal if said copy inhibiting signal is detected, and providing a third control signal for deleting said reservation data; and displaying a status of said recording operation.

9. The method according to claim 8, further comprising canceling the muting of said data signal if said copy inhibiting signal is no longer detected.

* * * * *